United States Patent
Friestad

(10) Patent No.: US 6,715,433 B1
(45) Date of Patent: Apr. 6, 2004

(54) RESTRAINT FOR A FLEXIBLE DRIVE SHAFT GEARBOX

(75) Inventor: Michael Eric Friestad, Rock Island, IL (US)

(73) Assignee: Deere & Company, Moline, IL (US)

( * ) Notice: Subject to any disclaimer, the term of this patent is extended or adjusted under 35 U.S.C. 154(b) by 2 days.

(21) Appl. No.: 10/214,968

(22) Filed: Aug. 8, 2002

(51) Int. Cl.$^7$ .............................. A01C 7/00; A01C 9/00
(52) U.S. Cl. ..................... 111/177; 111/200; 111/921
(58) Field of Search ........................ 111/177, 200, 111/921, 170, 178, 179, 183, 184, 185; 221/211; 74/11, 12

(56) References Cited

U.S. PATENT DOCUMENTS

| | | | |
|---|---|---|---|
| 718,664 A | 1/1903 | Shearer | |
| 2,923,444 A | 2/1960 | Orendorff | .................... 222/410 |
| 4,779,471 A | 10/1988 | Rettig | ............................ 74/13 |

FOREIGN PATENT DOCUMENTS

| | | |
|---|---|---|
| GB | 899733 | 6/1962 |
| WO | 00/51412 | 9/2000 |

OTHER PUBLICATIONS

Elliott Manufacturing Brochure, "Flexible Rotary Power Transmission Handbook, No. 327", front and back cover including 20 pages, printed in the U.S.A., Date unknown.

Elliott Manufacturing Brochure, "The Experienced Company with New Ideas in Power Transmission" 1 page front and back, printed in the U.S.A., Date unknown.

Stow Manufacturing Co. Brochure, "Stow Flexible Shafts and Flexible Couplings", 9$^{th}$ Edition, front and back cover including 39 pages, printed in the U.S.A., Date unknown.

Primary Examiner—Christopher J. Novosad

(57) ABSTRACT

A flexible rotatable drive shaft is used to drive a seed meter of a seeding machine. The seeding machine is provided with a seed meter gearbox. The seed meter gearbox has a flexible rotatable drive shaft receiving portion and a gear receiving portion. The gearbox output is drivingly coupled to the seed meter for driving the seed meter. The flexible rotatable drive shaft receiving portion extends outwardly from the gear receiving portion for receiving the drive ferrule of the flexible rotatable drive shaft. The gearbox restrain extends outwardly from the seeding machine and engages the flexible rotatable drive shaft receiving portion. The gearbox restrain comprises two legs that are parallel to the gearbox drive axis. The flexible rotatable drive shaft receiving portion is sandwiched between the two legs to prevent rotation of the gearbox.

8 Claims, 2 Drawing Sheets

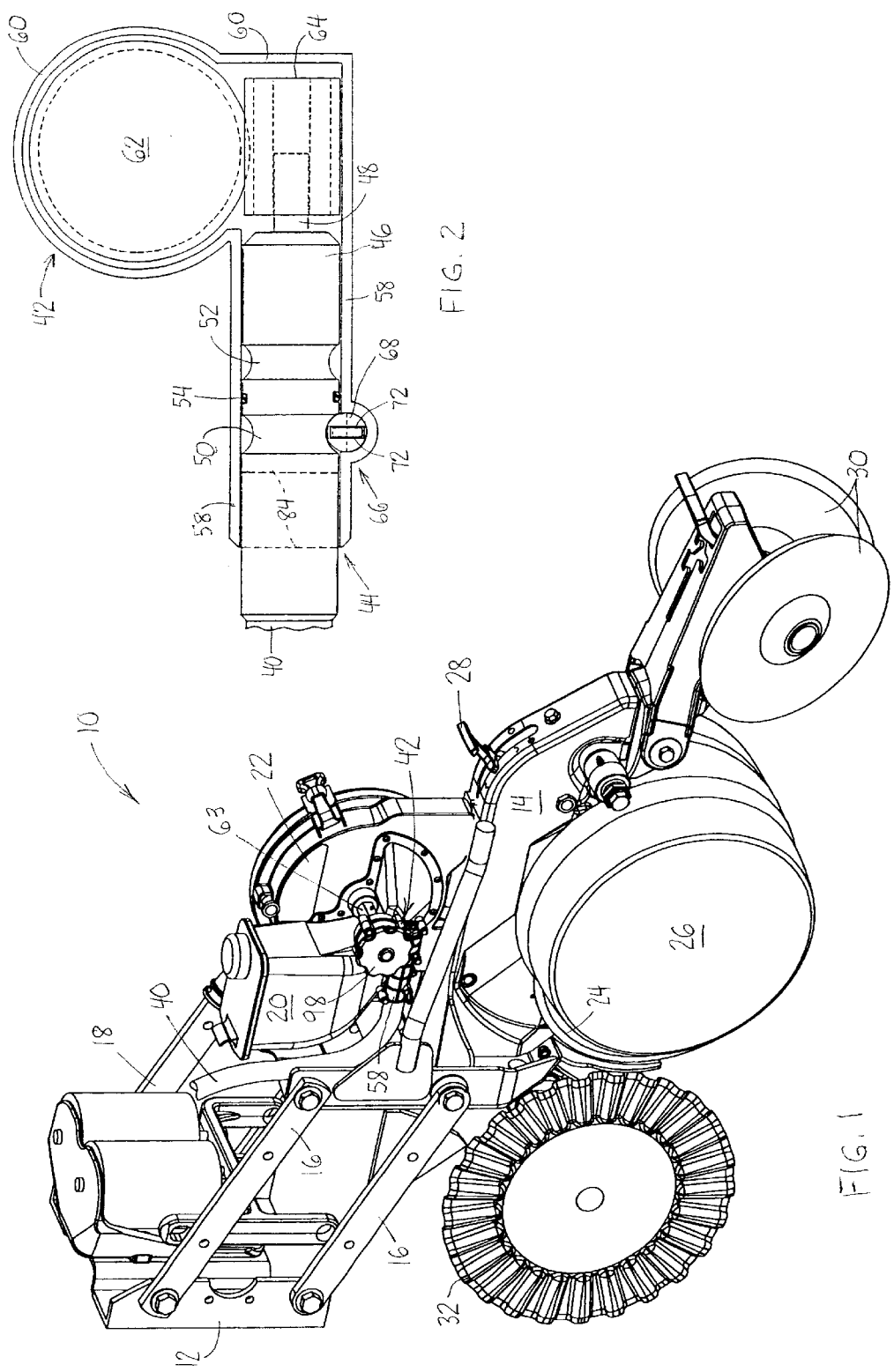

RESTRAINT FOR A FLEXIBLE DRIVE SHAFT GEARBOX

FIELD OF THE INVENTION

The present invention is directed to a restraint for a flexible drive shaft gearbox that is located on an auxiliary planting unit.

BACKGROUND OF THE INVENTION

Flexible rotatable drive shafts have been used in a variety of applications to transmit rotational force from one location to another. Traditionally, the flexible rotatable drive shaft has a male coupling for engaging a female coupling on a gearbox. When the male coupling engages the female coupling the flexible rotatable drive shaft is in a driving relationship with the gearbox. The gearbox is restrained from rotation by mounting bolts securing the gearbox to a structure.

Flexible rotatable drive shafts have been proposed for use on agricultural seeding machines, see U.S. Pat. Nos. 718, 664, and 4,779,471. The flexible drive shafts in these examples extend from a ground driven wheel to a seed meter. The ground driven wheel is coupled to a gearbox for driving the flexible drive shaft. The flexible drive shaft in turn drives a seed meter gearbox which drives the seed meter.

SUMMARY

It is an object of the present invention to prove a simple gearbox restrain for preventing the rotation of a flexible drive shaft gearbox that is mounted to a seeding machine.

A flexible drive shaft is used to drive a seed meter of a seeding machine. The seeding machine is provided with a seed meter gearbox. The seed meter gearbox has a flexible rotatable drive shaft receiving portion and a gear receiving portion. The gear receiving portion is provided with a gearbox output defining a gearbox drive axis. The gearbox output is drivingly coupled to the seed meter for driving the seed meter. The flexible rotatable drive shaft receiving portion extends outwardly from the gear receiving portion for receiving the drive ferrule of the flexible rotatable drive shaft. The gearbox restrain extends outwardly from the seeding machine and engages the flexible rotatable drive shaft receiving portion. The gearbox restrain comprises two legs that are parallel to the gearbox drive axis. The flexible rotatable drive shaft receiving portion is sandwiched between the two legs preventing the rotation of the gearbox.

BRIEF DESCRIPTION OF THE DRAWINGS

FIG. 1 is a rear perspective view of a seeding machine comprising an individual planting unit.

FIG. 2 is a cross sectional view of the gear box and rotatable drive shaft wherein the drive shaft is in its engaged position

DETAILED DESCRIPTION

Figure 4:
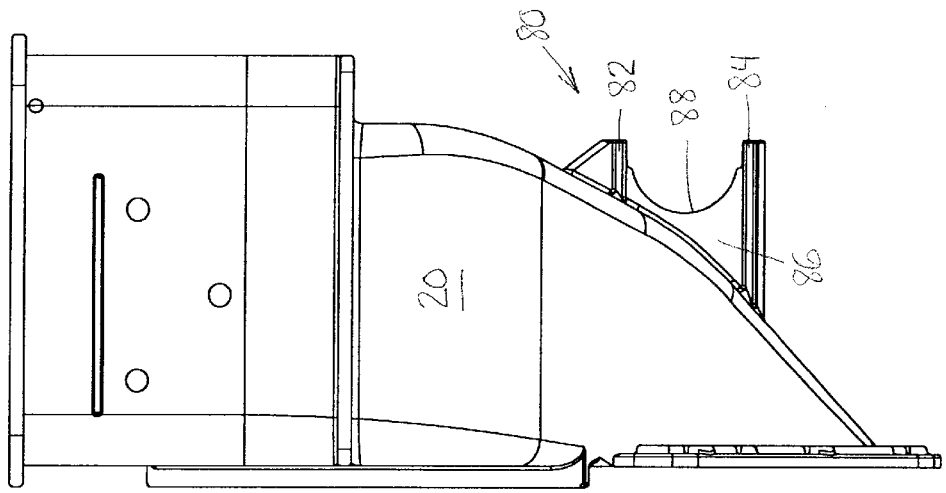
FIG. 4 is a front perspective view of the gearbox restraint.
Figure 3:
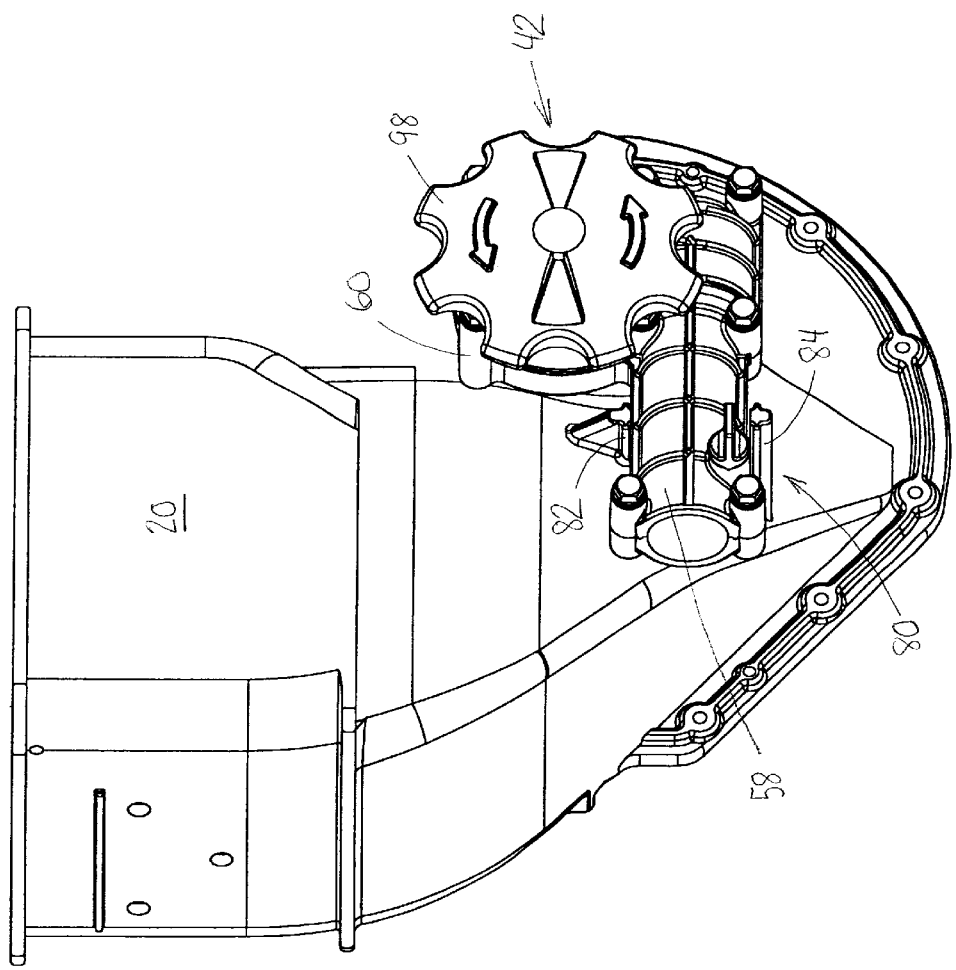
FIG. 3 is a front perspective view of the gearbox and the gearbox restraint.

The seeding machine 10 comprises an individual row crop planting unit that is mounted to a transverse toolbar, not shown, by U-bolts that engage a mounting plate 12. The planting unit is provided with a frame 14 that is coupled to the mouthing plate 12 by a parallel linkage 16. The parallel linkage 16 allows the planting unit to move up and down to a limited degree relative to the toolbar. Seed is automatically directed to the planter by a pneumatic seed on demand delivery system. The seed on demand delivery system directs the seed pneumatically from a main hopper, not shown, through seed hose 18 to an auxiliary hopper 20 mounted on fame 14. Seed in the auxiliary hopper 20 is metered by a seed meter 22 and directed to a planting furrow by a seed tube, not shown.

The planting furrow is formed by a double disc furrow opener 24 having depth gauging wheels 26. The depth of the planting furrow is controlled by the positioning of handle 28 which controls the vertical position of the depth gauging wheels 26 relative to the furrow opener 24. The planting furrow with metered seed deposited therein by the seed tube is closed by closing wheels 30. A forward mounted coulter 32 is used for slicing through crop residue before it encounters the furrow opener 24.

The seed meter 22 is driven by a flexible rotatable drive shaft 40 that drives gear box 42. The flexible and rotatable drive shaft 40 is of a type manufactured and marketed by Elliott Manufacturing Company, LLC of Binghamton, N.Y. A ground driven transmission, not shown, provides a rotational input into the flexible drive shaft 40. In this way the ground speed of the seeding machine 10 controls the speed of the seed meter 22. The flexible rotatable drive shaft 40 comprises a flexible outer sheath and a rotatable inner core. The end of the flexible rotatable drive shaft is provided with a male coupling 44 comprising a ferrule 46 and a faceted rotatable male drive member 48. The ferrule 46 is a metal sleeve having a first circumferential groove 50 and a second circumferential groove 52. An O-ring seal 54 is positioned between the circumferential grooves 50 and 52.

The gearbox 42 comprises a housing having a flexible rotatable drive shaft receiving portion 58 and a gear receiving portion 60. Two helical gears 62 and 64 are mounted in the gear receiving portion 60 of the housing. The first helical gear 62 is drivingly coupled to the seed meter 22 by gearbox output 63. The second helical gear 64 is drivingly coupled to the first helical gear 62. The second helical gear 64 is provided with a multifaceted bore that receives the male drive member 48 of the flexible rotatable drive shaft 40. When the drive shaft 40 is in its engaged position, illustrated in FIG. 2, the second helical gear 64 is driven by the flexible rotatable. drive shaft 40.

The cylindrical flexible rotatable drive shaft receiving portion 58 is provided with a latch 66 comprising a transverse pin 68. In the embodiment illustrated in FIGS. 1–2, the pin 68 is rotatively positioned in a transverse bore located on the flexible rotatable drive shaft receiving portion 58 of the gearbox housing 42. The pin 68 has a first end with two operator engaging surfaces 72. To move the pin 68 between latched and unlatched positions, the operator engages the operator engaging surfaces 72 and pushes the pin 68 inwardly and then rotates the pin 68 to the desired position.

The ferrule 46 forms a male coupling that engages the female coupling formed by the flexible rotatable drive shaft receiving portion 58 of the gearbox 42. The first circumferential groove 50 defines the fully engaged position of the flexible rotatable shaft 40. In the fully engaged position the flexible rotatable shaft 40 is drivingly coupled to the gearbox 42 for driving the seed meter 22. The second circumferential groove 52 defines an intermediate engaged position of the flexible rotatable shaft 40. In the intermediate engaged position, the flexible rotatable shaft 40 is coupled to the ferrule receiving portion 58 of the gearbox housing, but it is not drivingly coupled to the second helical gear 64.

An operator knob 98 is mounted for the gearbox 42 for manually rotating the seed meter 22. In addition this knob 98 can be used to move the second helical gear so that it registers with the male driving member 48 when it is inserted into the gearbox housing 42.

As gear 62 is driven by the flexible rotatable drive shaft, the gearbox 42 tries to rotate about the gearbox drive axis. To prevent this rotation, the seed hopper 20 is provided with a gearbox restraint 80. The gearbox restraint 80 extends outwardly from the seeding machine 10 and comprises two legs 82 and 84. The two legs 82 and 84 are parallel to the drive axis. The two legs 82 and 84 prevent the rotation of the gearbox 42 in either a clockwise direction or a counterclockwise direction about the drive axis.

The gearbox housing and the hopper 20 are made of plastic. The legs 82 and 84 are integral with the seed hopper being molded into the hopper. As illustrated in FIG. 4, a web 86 extends between the legs. The web 86 has an arcuate edge 88 to accommodate the cylindrical flexible rotatable drive shaft receiving portion 58. Although the gearbox restraint 80 is illustrated as being molded into the seed hopper 20, it could also be a separate element mounted to the seeding machine.

Having described the preferred embodiment, it will become apparent that various modifications can be made without departing from the scope of the invention as defined in the accompanying claims.

What is claimed is:

1. An agricultural seeding machine for planting a crop, the seeding machine comprising:

a frame;

a seed hopper for holding seed is mounted to the frame;

a seed meter is mounted to the frame for metering seed received from the seed hopper;

a furrow opener is mounted to the frame for forming a seed trench in a field into which metered seed from the seed meter is directed;

a flexible rotatable drive shaft having a first coupling with a drive shaft output;

a gearbox having a gear receiving portion and a flexible rotatable drive shaft receiving portion, the gear receiving portion has a gearbox output for driving the seed meter, the gearbox output defines a gearbox drive axis, the flexible rotatable drive shaft receiving portion has a second coupling for receiving the first coupling of the flexible rotatable drive shaft, the drive shaft output of the flexible rotatable drive shaft is drivingly coupled by the gearbox to the gearbox output when the first coupling is coupled to the second coupling;

a gearbox restraint extends outwardly from the seed hopper for engaging the flexible rotatable drive shaft receiving portion of the gearbox preventing rotation of the gearbox about the gearbox drive axis.

2. An agricultural seeding machine as defined by claim 1 wherein the flexible rotatable drive shaft receiving portion of the gearbox extends outwardly from the gear receiving portion.

3. An agricultural seeding machine as defined by claim 2 wherein the gearbox restraint comprises two legs, the flexible rotatable drive shaft receiving portion, is sandwiched between the two legs.

4. An agricultural seeding machine as defined by claim 3 wherein the two legs are joined to one another by a web.

5. An agricultural seeding machine as defined by claim 4 wherein the two legs and the web are integral with the seed hopper.

6. An agricultural seeding machine as defined by claim 5 wherein the seed hopper is plastic and the two legs and the web are molded with the seed hopper.

7. An agricultural seeding machine as defined by claim 6 wherein the flexible rotatable drive shaft receiving portion is cylindrical and the web has an arcuate edge for receiving the cylindrical flexible rotatable drive shaft receiving portion.

8. An agricultural seeding machine as defined by claim 3 wherein the seed hopper is plastic and the two legs are molded into the seed hopper.

\* \* \* \* \*